A. H. KERR.
PNEUMATIC CUSHIONED TIRE.
APPLICATION FILED MAR. 5, 1920.

1,382,918.

Patented June 28, 1921.

UNITED STATES PATENT OFFICE.

AUGUSTUS HALLAWELL KERR, OF FORT WORTH, TEXAS, ASSIGNOR TO SAID AUGUSTUS H. KERR, J. A. SMITH, J. M. ATKINSON, J. A. DACUS, AND W. L. COLEY, TRUSTEES FOR AN ASSOCIATION.

PNEUMATIC CUSHIONED TIRE.

1,382,918.  Specification of Letters Patent.  Patented June 28, 1921.

Application filed March 5, 1920. Serial No. 363,501.

*To all whom it may concern:*

Be it known that I, AUGUSTUS H. KERR, a citizen of the United States, residing at Fort Worth, in the county of Tarrant and State of Texas, have invented certain new and useful Improvements in Pneumatic Cushioned Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to pneumatic tires, and it has for its object to form a pneumatic-cushion tire made up of two mating casing sections or segments each formed with beads at the rim and at the tread terminals designed to be received by the clencher clamping-plates by which the casing sections are held together, the outer or tread clencher-plate being peculiarly formed, that is, with edge guards which project outward beyond the maximum projection of the sides of the sections under maximum distention so that the edge extensions of the clencher-plate will serve as guards to protect and shield the sides of the casing-sections against abrasion when the wheel runs into ruts or against side obstructions in the travel of the vehicle. By thus protecting the sides of the casing-sections wear on the sections is avoided, blow-outs and punctures guarded against, and the integrity and life of the tire materially prolonged.

To the accomplishment of the foregoing and such other objects as may hereinafter appear the invention consists in the features hereinafter particularly described and then sought to be clearly defined by the claims, reference being had to the accompanying drawing forming a part hereof and in which—

Figure 1:
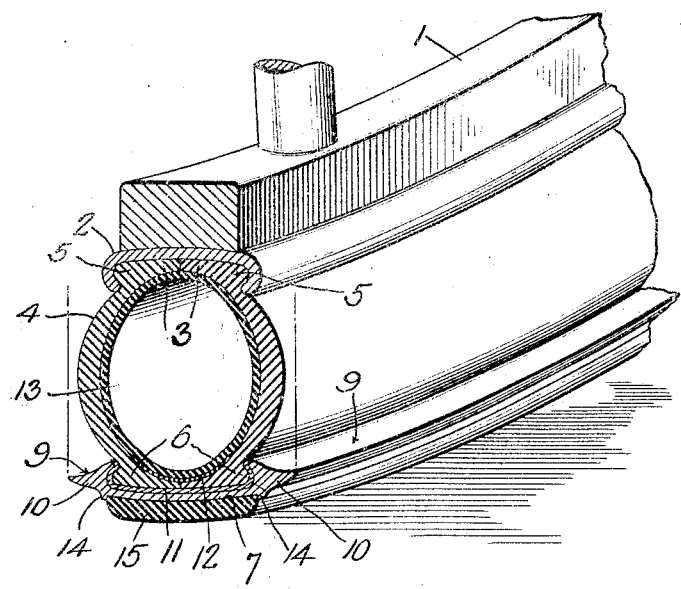
Figure 1 is a perspective view, in cross section, showing a portion of a wheel with my invention applied.
Figure 2:
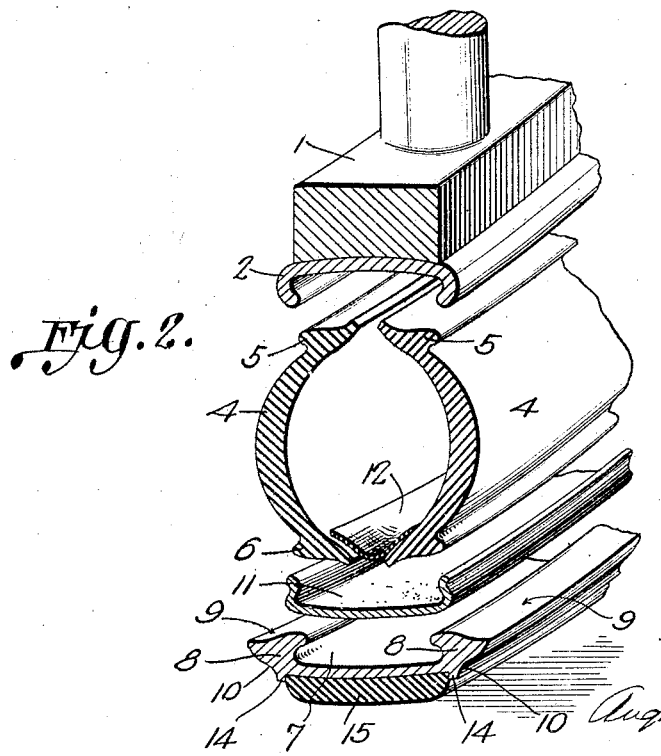
Fig. 2 is a view similar to Fig. 1, with the parts separated one from the other.

In the drawing the numeral 1 designates the felly of a wheel provided with a clencher rim 2 designed to receive the adjacent abutting edges 3 of the two segments of a casing 4. Each segment of the casing is formed at the wheel-rim terminal with a bead 5 which fits within and is gripped by the clencher-rim 2, with the meeting edges of the two segments abutting squarely one against the other as illustrated in Fig. 1 of the drawing. The opposite tread terminal edges of the casing sections are formed with beads 6, and when in position the meeting edges of the tread terminals abut squarely against each other as indicated in Fig. 1. The tread-terminals of the casing segments are held together by a clencher-plate 7 which receives the beads 6 of the segments as illustrated in Fig. 1. The edges of this clencher-plate are formed with extensions or flanges 8 constituting guards which extend out beyond the maximum projection of the sides of the two-part casing so as to shield the sides of the casing at maximum distention against abrasion occasioned by the wheel running in a rut or against side obstructions. These guards receive the impact of the sides of the rut or obstruction and keep the same from contacting with the sides of the casing, and abrasion and wear of the casing is thus guarded against, and blow-outs occasioned by weakening of the sides of the casing are thus avoided. These guards are preferably tapered laterally outward, with an inner surface 9 inclined laterally and outwardly and an outer surface 10 inclined laterally and inwardly, thus tending to throw outwardly substances against which they may strike, while the inner inclined surface will tend to the outward discharge of any material that may lodge thereon. The formation also serves to afford the greatest resisting strength at the base of the guards, and at the same time make possible the minimum weight with the maximum strength. The base of this clencher-plate between the guards also serves to protect the base of the casing against punctures, and the guards also serve to protect the lower side portions of the casing adjacent to the tread against punctures.

I prefer to place a sheet of asbestos 11 between the segments of the casing and the clencher-plate so as to protect the casing against heat from the clencher-plate engendered in running of the car.

If desired, there may be attached to one segment of the casing an adhesive strip or flap 12 which, if occasion should require, can be extended over the joint between the two sections and cemented to the opposite section of the casing. This can be readily done by removing the fabric which lies over the adhesive side of the flap as commonly found in adhesive rubber tape used for rubber repair work.

The two-part casing will be provided with the usual inner rubber tube or tire 13.

I also prefer to form the outer face of the tread clencher-plate with parallel ribs 14 so that if the plate be provided with a rubber tread 15, these ribs will resist any side twisting or strain on the rubber tread which in making sudden or sharp turns is apt to force the rubber tread out of place but which will be obviated under the feature specified.

The cushioned tire formed as described can have the parts readily assembled, and when the inner tube is inflated the casing segments will be distended and the clencher-rim and clencher-plate at the tread will securely grip the beads and hold the sections or segments tightly in place. The inner meeting edges of the casing abutting squarely one against the other, at both the rim and the tread portions of the tire, offer resistance to the inner movement of the sections in case of partial deflation or escape of air, and thus the segments are prevented from collapsing. The tread clencher-plate by reason of the extension flange construction specified serves to prevent puncture at the tread and also at the sides of the casing next to the tread, and also serves to guard the sides of the casing against abrasion and damage.

Having described my invention and set forth its merits what I claim is:

1. A pneumatic cushioned tire comprising a two-part casing, the sections thereof being formed with inner and outer terminal beads and the sections disposed to have their adjacent meeting edges abut one against the other, a clencher-rim to grip the inner beads of the sections, and a clencher plate disposed to grip the outer beads, said clencher-plate being formed with edge-flange guards extended to lie beyond the maximum projection of the sides of the casing substantially in line with the outer beads of the casing, the inner faces of the guards being concave to receive said beads and the guards next to their concave faces having a relatively greater thickness than the connecting web portion of the clencher plate.

2. A pneumatic cushioned tire comprising a two-part casing, the sections thereof being formed with inner and outer terminal beads and the sections disposed to have their adjacent meeting edges abut one against the other, a clencher-rim to grip the inner beads of the sections, and a clencher-plate extending across the meeting edges of the tread portion of the two casing-sections, and formed with edge flange guards extended to lie beyond the maximum projection of the sides of the casing, substantially in line with the outer beads of the casing, the base of the guards next to the casing-beads having a relatively greater thickness than the web portion of the plate and having their inner faces concaved to receive the casing beads, and a liner having inwardly extending flanges shaped to conform to the inner concave faces of the guards and disposed to lie between the web and guards of the plate and the outer beads of the casing-sections.

3. A pneumatic cushioned tire comprising a two-part casing, the sections thereof being formed with inner and outer terminal beads and the sections disposed to have their adjacent meeting edges abut one against the other, a clencher-rim to grip the inner beads, and a clencher-plate to grip the outer beads, said outer clencher-plate formed of a web portion to extend across the meeting edges of the tread portion of the casing-sections and provided at opposite edges with flange guards extended to lie beyond the maximum projection of the sides of the casing substantially in line with the outer beaded edges of the casing, the inner faces of the guards being concave to receive said beads and the guards next to their concave faces having a relatively greater thickness than the connecting web portion of the plate, and parallel longitudinally extending spaced-apart ribs on the outer face of the web to form a recess for a solid rubber tread.

In testimony whereof I affix my signature in presence of two witnesses.

AUGUSTUS HALLAWELL KERR.

Witnesses:
W. L. COLEY,
BLANCHE SHIPMAN.